US008800523B2

(12) United States Patent
Fujiwara et al.

(10) Patent No.: US 8,800,523 B2
(45) Date of Patent: Aug. 12, 2014

(54) ENGINE AUTOMATIC STOP AND RESTART APPARATUS

(75) Inventors: Michitaka Fujiwara, Kobe (JP); Tsuneo Tanabe, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 744 days.

(21) Appl. No.: 13/088,057

(22) Filed: Apr. 15, 2011

(65) Prior Publication Data

US 2012/0103292 A1    May 3, 2012

(30) Foreign Application Priority Data

Oct. 28, 2010  (JP) .................. 2010-242259

(51) Int. Cl.
*F02N 11/00* (2006.01)
*F02N 11/08* (2006.01)
*F02D 41/00* (2006.01)
*F02D 45/00* (2006.01)
*F02D 41/06* (2006.01)
*F02D 41/04* (2006.01)

(52) U.S. Cl.
CPC ............... *F02N 11/00* (2013.01); *F02N 11/08* (2013.01); *F02N 11/0814* (2013.01); *F02N 11/0818* (2013.01); *F02D 41/06* (2013.01); *F02D 41/042* (2013.01); *F02D 45/00* (2013.01)
USPC ..................................................... 123/179.4

(58) Field of Classification Search
CPC ..... F02N 11/00; F02N 11/08; F02N 11/0814; F02N 11/0818; F02N 11/0844; F02D 41/042; F02D 41/06; F02D 45/00
USPC ............... 123/179.3, 179.4, 179.16; 701/112, 701/113, 103, 104, 102; 290/34, 48, 38 R, 290/40 R, 40 A
See application file for complete search history.

(56) References Cited

U.S. PATENT DOCUMENTS

| | | | |
|---|---|---|---|
| 6,555,927 B1 * | 4/2003 | Suzuki et al. | 290/34 |
| 6,969,923 B2 * | 11/2005 | Kitagawa | 290/36 R |
| 7,412,954 B2 * | 8/2008 | Shiino et al. | 123/179.16 |
| 8,474,429 B2 * | 7/2013 | Bouchon et al. | 123/179.3 |

* cited by examiner

*Primary Examiner* — Hieu T Vo
(74) *Attorney, Agent, or Firm* — Sughrue Mion, PLLC; Richard C. Turner

(57) ABSTRACT

An apparatus including an engine control unit which is configured to: start to supply electricity to a starter motor and start measurement of a power supply period; supply electricity to a solenoid when an absolute value of a rpm difference between an rpm of the engine and an estimated rpm of a pinion gear determined from a rpm table based on the measured power supply period becomes smaller than a rpm difference threshold value at which the pinion gear and a ring gear can be engaged with each other; judge that the engine is self-resumed when the engine becomes a state capable of self rotation with only fuel supply in a case where the rpm of the engine is larger than the estimated rpm of the pinion gear; and finish supplying electricity to the starter motor and finish measuring the power supply period, and finish supplying electricity to the solenoid.

2 Claims, 14 Drawing Sheets

ENGINE AUTOMATIC STOP AND RESTART APPARATUS

BACKGROUND OF THE INVENTION

1. Field of the Invention

The present invention relates to an engine automatic stop and restart apparatus which automatically stops an engine when an automatic stop condition is satisfied, and restarts the engine when a restart condition is satisfied, thereafter.

2. Description of the Related Art

Recently, there is developed an engine automatic stop and restart apparatus for the purpose of improving fuel consumption of an automobile and reducing environmental load, in which when a driver's operation satisfies a predetermined condition for stopping an engine (for example, a pedaling operation of a brake pedal when a vehicle is moving at a speed lower than a predetermined speed), fuel supply is automatically cut off so that the engine is automatically stopped, and after that, when a driver's operation satisfies a predetermined condition for restarting the engine (for example, a releasing operation of the brake pedal, a pedaling operation of an accelerator pedal, and the like), fuel injection is restarted so that the engine is automatically restarted.

Conventionally, there is proposed the following engine automatic stop and restart apparatus (see, for example, Japanese Patent Application No. 2010-033545 filed on Feb. 18, 2010). Specifically, when starting an engine restart process after idling stop, it is judged whether or not self-resumption (restart) can be performed by restarting fuel supply based on an rpm of the engine. When it is judged that the self-resumption can be performed, the engine is restarted only by supplying a fuel without using a starter motor. On the contrary, when it is judged that the self-resumption cannot be performed by itself, supply of electricity to the starter motor is started, connection between a pinion gear and a ring gear is started along with synchronization between the rpm of the starter motor and the rpm of the engine, the connection between the pinion gear and the ring gear is completed when the rpm of the starter motor (that means rpm of the pinion gear, and the same is true in the description below) and the rpm of the engine are synchronized with each other, with the result that the starter motor drives the engine. When it is judged that the engine can be self-resumed, the pinion gear and the ring gear are disconnected.

In this engine automatic stop and restart apparatus described in the related application (Japanese Patent Application No. 2010-033545), the engaged state between the pinion gear and the ring gear is realized before the engine rotation is completely stopped. Therefore, quick restart of the engine can be performed. In addition, when it is judged that the self-resumption can be performed only by supplying the fuel, rotation of the starter motor is stopped even if the starter motor has started to rotate so as to restart the engine only by supplying the fuel. Therefore, use frequency of the starter motor can be reduced, thereby being capable of reducing energy consumption.

In the apparatus described in the above-mentioned related application, as illustrated in FIG. 13, the engine is automatically stopped at time t1, and after that restart of the engine is started at time t2 when it is judged that the rpm of the engine cannot be self-resumed. Then, supply of electricity to the starter motor is started, the connection between the pinion gear and the ring gear is started at time t3, and the connection is completed at time t4. After that, combustion of the engine causes an increase of the rpm of the engine at time t5. The increase of the rpm of the engine is counted by a combustion judgment counter. When a value of the combustion judgment counter becomes above a self-resumption judgment threshold value at time t6, it is judged that the engine is self-resumed. Then, the pinion gear and the ring gear are disconnected, and supply of electricity to the starter motor is stopped. However, if the combustion of the engine is unstable, when it is judged that the engine is self-resumed to disconnect the pinion gear and the ring gear and stop supply of electricity to the starter motor, a restart error may occur. In other words, there is a problem that an engine stop may occur because the engine and the starter motor are disconnected despite that the engine is not self-resumed.

Therefore, in the related application, there is also provided a method of reducing a restart error by setting the self-resumption judgment threshold value for judging the self-resumption of the engine to a larger value when restarting in a low speed region of the rpm of the engine so that the starter motor is driven until the rpm of the engine becomes an rpm of the self-resumption even if the combustion of the engine is unstable. However, as illustrated in FIG. 14, after the engine is automatically stopped at time t1, the restart of the engine is started at time t2 when it is judged that the rpm of the engine cannot be self-resumed. Then, supply of electricity to the starter motor is started, the connection between the pinion gear and the ring gear is started at time t3, and the connection is completed at time t4. After that, combustion of the engine causes an increase of the rpm at time t5. The increase of the rpm of the engine is counted by the combustion judgment counter. Even if the combustion of the engine becomes stable after time t5 and the engine is self-resumed without being driven by the starter motor, when the self-resumption judgment threshold value is set to a large value, the connection between the pinion gear and the ring gear is maintained and the supply of electricity to the starter motor is performed until a value of the combustion judgment counter becomes above the self-resumption judgment threshold value at time t6. Thus, there is a problem that wasteful energy is consumed.

SUMMARY OF THE INVENTION

The present invention has been made to solve the problem described above, and an object thereof is to provide an engine automatic stop and restart apparatus that can perform engine restart securely and can suppress a power supply period of the starter motor to a minimum.

According to the present invention, there is provided an engine automatic stop and restart apparatus which automatically stops an engine when an automatic stop condition is satisfied, and then restarts the engine when a restart condition is satisfied, the engine automatic stop and restart apparatus including: a starter motor which rotates by being supplied with electricity; a pinion gear provided to a rotation shaft of the starter motor; a plunger which pushes the pinion gear in a direction of the rotation shaft so that the pinion gear engages with a ring gear provided to a crank shaft of the engine; a solenoid which moves the plunger in the direction of the rotation shaft by being supplied with electricity; a start control unit which connects a power supply to the starter motor in response to a first drive signal so that the starter motor is supplied with electricity, and connects the power supply to the solenoid in response to a second drive signal so that the solenoid is supplied with electricity; a crank angle sensor which detects a crank angle of the engine to output a crank angle signal; a fuel injection unit which injects a fuel into the engine; a rpm table which describes a relationship between a power supply period of the starter motor and an estimated rpm of the pinion gear; and an engine control unit which is configured to: control the fuel injection unit to inject the fuel into the engine after a restart process is started, and output a first drive signal to the start control unit so as to start to supply electricity to the starter motor and start measurement of the power supply period of the starter motor; output a second drive signal to the start control unit so as to start to supply electricity to the solenoid when an absolute value of a rpm difference between an rpm of the engine calculated based on a period of the crank angle signal and an estimated rpm of the pinion gear determined from the rpm table based on the measured power supply period becomes smaller than a rpm difference threshold value at which the pinion gear and the ring gear can be engaged with each other; judge that the engine is self-resumed when the engine becomes a state capable of self rotation with only fuel supply in a case where the rpm of the engine calculated based on the period of the crank angle signal is larger than the estimated rpm of the pinion gear determined from the rpm table based on the measured power supply period; and stop outputting the first drive signal to the start control unit so as to finish supplying electricity to the starter motor when it is judged that the engine is self-resumed and finish measuring the power supply period of the starter motor, and stop outputting the second drive signal to the start control unit so as to finish supplying electricity to the solenoid.

According to the engine automatic stop and restart apparatus of the present invention, engine restart can be performed securely in the case where the engagement between the pinion gear and the ring gear is necessary while the engine is idling, and a power supply period of the starter motor can be shortened.

DETAILED DESCRIPTION OF THE PREFERRED EMBODIMENTS

Hereinafter, preferred embodiments of an engine automatic stop and restart apparatus of the present invention are described with reference to the attached drawings.

First Embodiment

Figure 1:
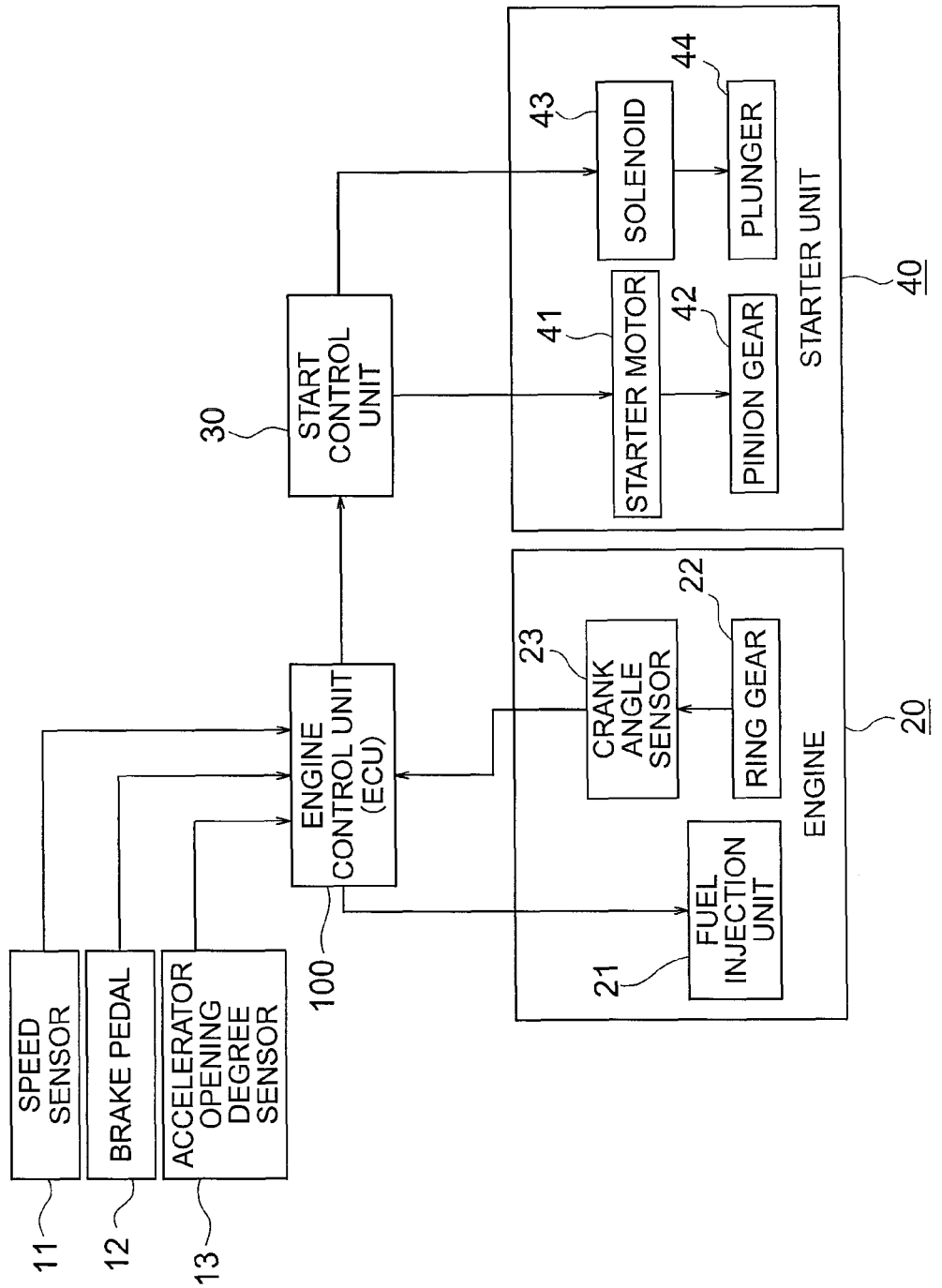
FIG. 1 is a block diagram illustrating a structure of an engine automatic stop and restart apparatus according to a first embodiment of the present invention.

An engine automatic stop and restart apparatus according to a first embodiment of the present invention is described with reference to FIGS. 1 to 8. FIG. 1 is a block diagram illustrating a structure of the engine automatic stop and restart apparatus according to the first embodiment of the present invention. Note that, the same numeral or symbol denotes the same part or corresponding parts in the diagrams.

In FIG. 1, the engine automatic stop and restart apparatus according to the first embodiment of the present invention includes a speed sensor 11 which detects a speed of a vehicle so as to output a speed signal, a brake pedal 12 which outputs a brake signal indicating an operation state of the pedal, an accelerator opening degree sensor 13 which detects an accelerator opening degree so as to output an accelerator opening degree signal, an engine 20, a start control unit 30, a starter unit 40, and an engine control unit (ECU) 100.

The engine 20 includes a fuel injection unit 21, a ring gear 22 connected to a crank shaft of the engine, and a crank angle sensor 23 which detects a crank angle for determining a cylinder to be injected with a fuel so as to output a crank angle signal.

The start control unit 30 connects a power supply to a starter motor 41 in response to a drive signal S1 output from the engine control unit 100 so as to supply electricity to the starter motor 41, and connects the power supply to a solenoid 43 in response to a drive signal S2 output from the engine control unit 100 so as to supply electricity to the solenoid 43. In addition, the start control unit 30 can control the supply of electricity to the starter motor 41 and the supply of electricity to the solenoid 43 independently of each other.

The starter unit 40 includes the starter motor 41 which rotates when electricity is supplied thereto, a pinion gear 42 provided to a rotation shaft of the starter motor 41, a plunger 44 which pushes the pinion gear 42 in the direction of the rotation shaft so that the pinion gear 42 engages with the ring gear 22 provided to the crank shaft of the engine, and the solenoid 43 which moves the plunger 44 in the direction of the rotation shaft when electricity is supplied thereto.

The engine control unit 100 controls the fuel injection unit 21 and judges an automatic stop condition or a restart condition so as to deliver the drive signals S1 and S2 to the start control unit 30.

The engine control unit (ECU) 100 includes various I/F circuits (not shown) and a microcomputer (not shown). In addition, the microcomputer includes: an A/D converter (not shown) which converts analog signals such as detection signals of various sensors into digital signals; a CPU (not shown) which executes various control programs such as an engine automatic stop and restart control program; a ROM (not shown) which stores the engine automatic stop and restart control program, various control programs, control constants, an rpm table illustrated in FIG. 6, various tables, and the like; and a RAM (not shown) which stores variables and the like when the various control programs are executed.

Next, operation of the engine automatic stop and restart apparatus according to the first embodiment is described with reference to the drawings.

Figure 2:
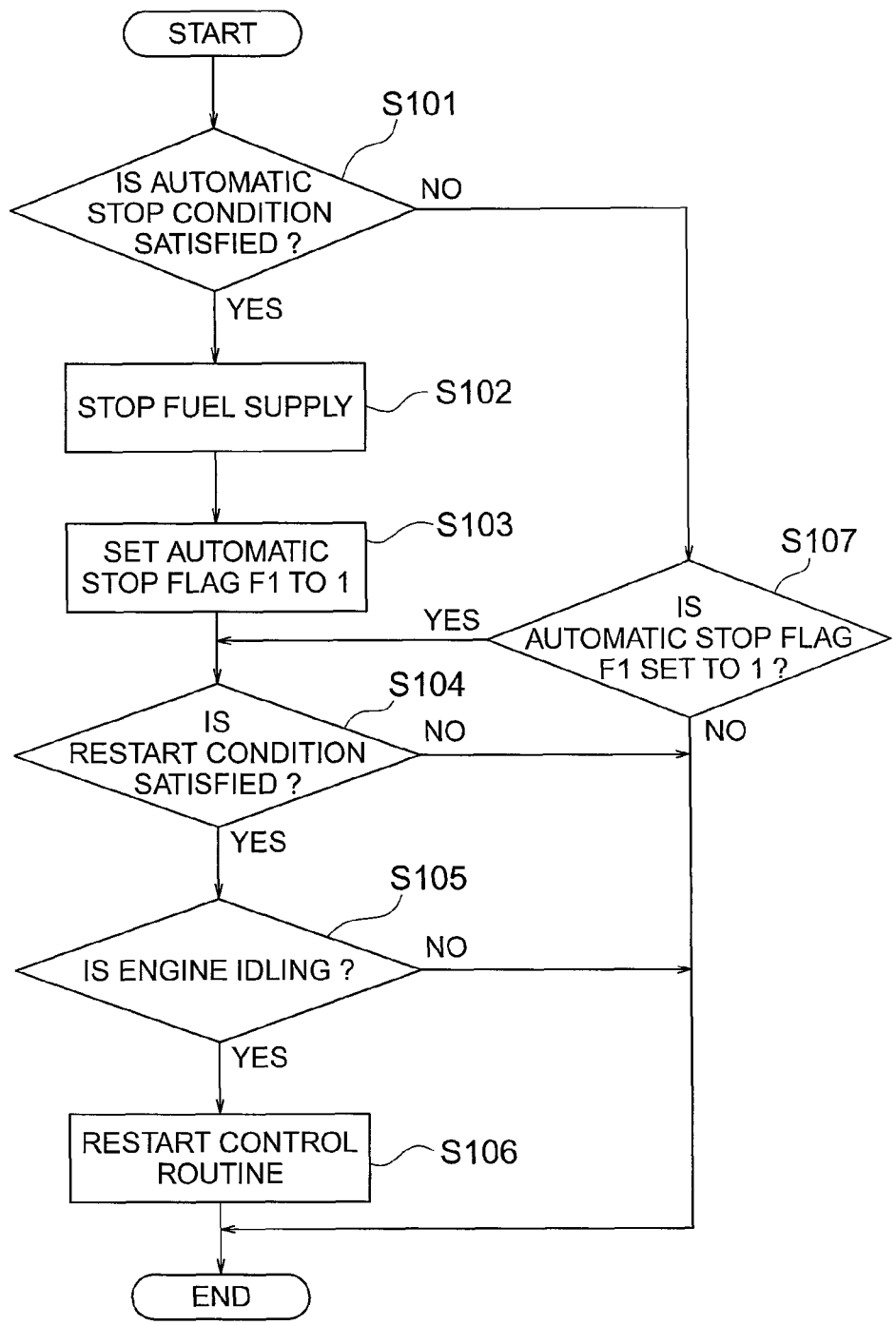
FIG. 2 is a flowchart illustrating operation of the engine automatic stop and restart apparatus according to the first embodiment of the present invention.
Figure 3:
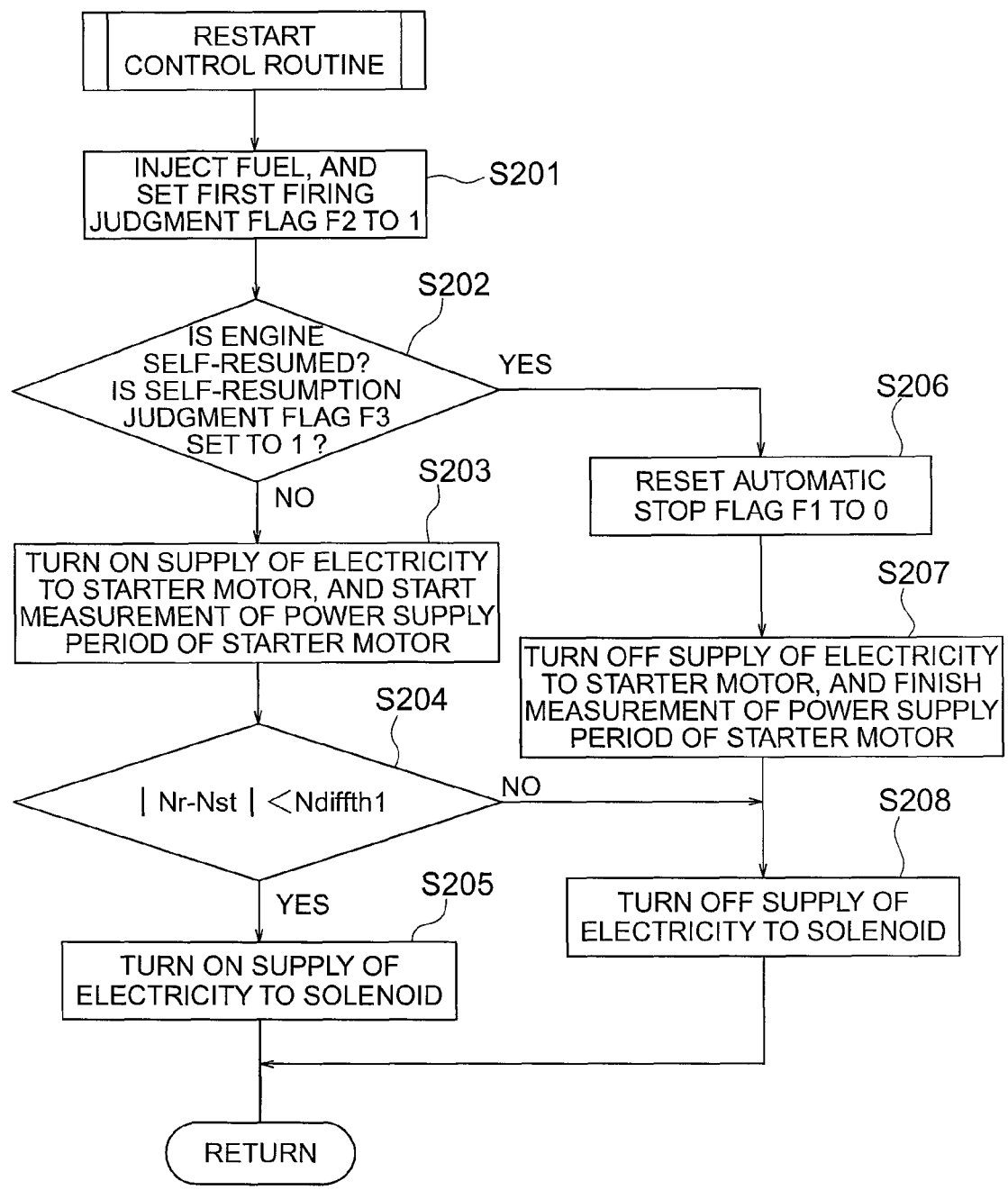
FIG. 3 is a flowchart illustrating operation of the engine automatic stop and restart apparatus according to the first embodiment of the present invention.
Figure 4:
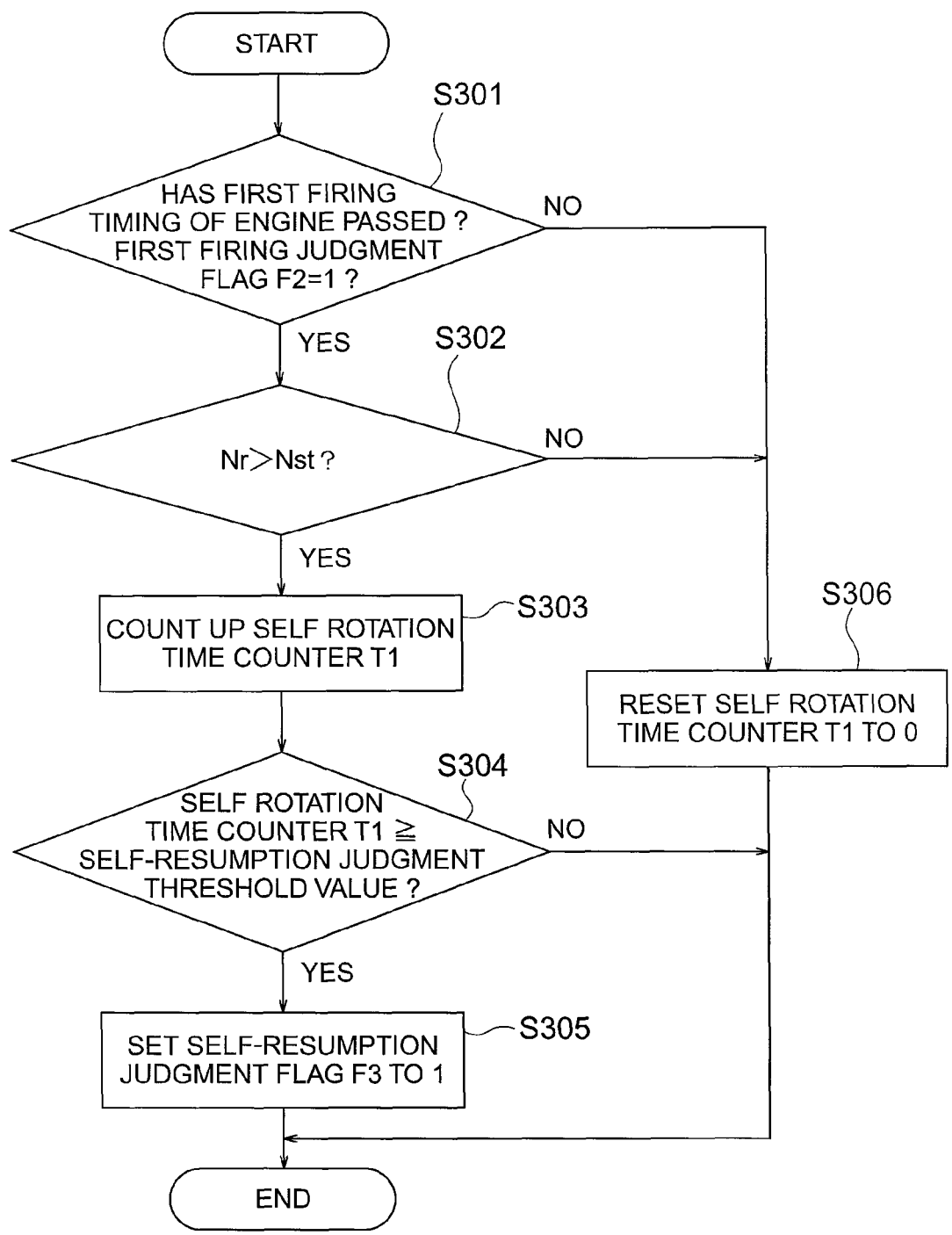
FIG. 4 is a flowchart illustrating operation of the engine automatic stop and restart apparatus according to the first embodiment of the present invention.

Contents of processes performed by the microcomputer of the engine control unit (ECU) 100 are described with reference to flowcharts illustrated in FIGS. 2, 3, and 4. FIGS. 2 to 4 are flowcharts illustrating operation of the engine automatic stop and restart apparatus according to the first embodiment of the present invention.

FIGS. 2 to 4 are flowcharts illustrating the processes performed by the microcomputer, and the processes of Steps (referred to as "S" simply in the diagrams) 101-107, Steps 201-208, and Steps 301-306 are performed by the engine automatic stop and restart control program in the ROM.

FIG. 2 illustrates an automatic stop process, FIG. 3 illustrates a restart control process, and FIG. 4 illustrates a self-resumption process. These processes are, for example, performed at a constant period of 1.25 milliseconds.

The engine control unit (ECU) 100 starts its operation when an ignition switch of the vehicle is turned on so that the power is supplied. In the engine control unit 100, the CPU of the microcomputer performs the engine automatic stop and restart control program in the ROM.

First, in Step 101 of FIG. 2, the microcomputer of the engine control unit (ECU) 100 (hereinafter referred to as "engine control unit 100" simply) judges whether or not the automatic stop condition is satisfied. This automatic stop condition is, for example, an operation state in which the speed is 5 km/h or lower and the driver is pedaling the brake pedal 12. This speed is based on a speed signal output from the speed sensor 11, and the operation state in which the brake pedal 12 is pedaled is based on an ON state of the brake signal output from the brake pedal 12. When the automatic stop condition is satisfied (YES), the process proceeds to the next Step 102. When the automatic stop condition is not satisfied (NO), the process proceeds to Step 107.

Next, in Step 102, the engine control unit 100 controls the fuel injection unit 21 to stop fuel supply to the engine 20.

Next, in Step 103, the engine control unit 100 sets an automatic stop flag F1 to "1".

Next, in Step 104, the engine control unit 100 judges whether or not the restart condition is satisfied. This restart condition is, for example, an operation state in which the brake pedal 12 is released by the driver and an operation state in which the driver is pedaling the accelerator pedal. In this operation state in which the brake pedal 12 is released is based on an OFF state of the brake signal output from the brake pedal 12, and the operation state in which the accelerator pedal is pedaled is based on the accelerator opening degree signal output from the accelerator opening degree sensor 13. When the restart condition is satisfied (YES), the process proceeds to the next Step 105. When the restart condition is not satisfied (NO), the process is finished.

Next, in Step 105, the engine control unit 100 judges whether or not the engine 20 is idling. This judgment as to whether or not the engine 20 is idling is, for example, made based on presence or absence of the crank angle signal output from the crank angle sensor 23. When the engine 20 is idling (YES), the process proceeds to the next Step 106. When the engine 20 is not rotating, namely when it is stopped completely (NO), the process is finished.

Next, in Step 106, the engine control unit 100 performs a restart control routine illustrated in FIG. 3, which is described later.

In Step 107, the engine control unit 100 judges whether or not the automatic stop flag F1 is "1". When the automatic stop flag F1 is "1" (YES), it is judged that the engine 20 is stopped automatically, and the process proceeds to Step 104 to judge whether or not the restart condition is satisfied. On the other hand, when the automatic stop flag F1 is "0" (NO), it is judged that the engine 20 is not stopped automatically, and the process is finished.

Next, in Step 201 of FIG. 3, the engine control unit 100 controls the fuel injection unit 21 to inject a starting fuel to the engine 20.

Figure 5:
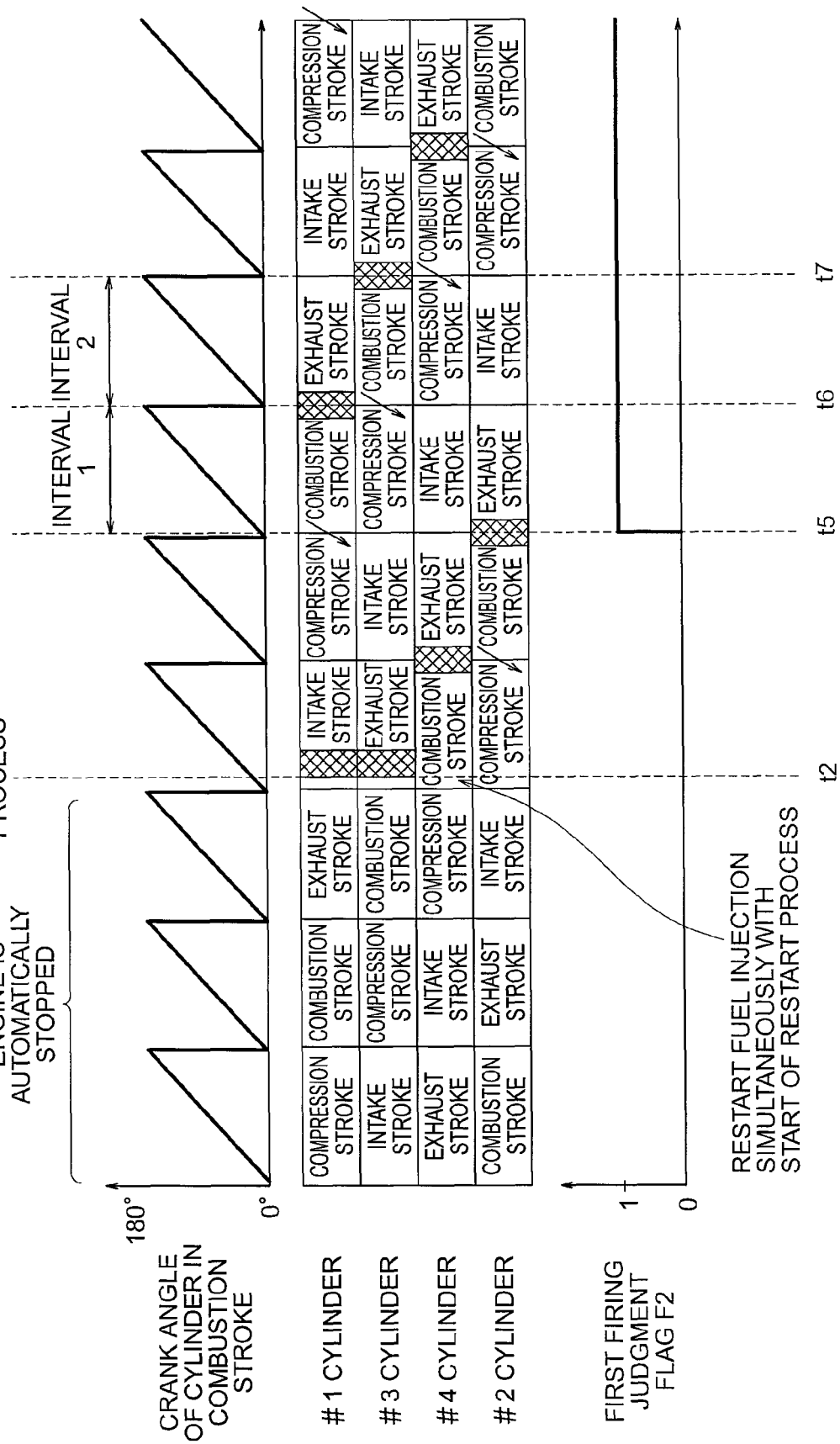
FIG. 5 is a diagram illustrating fuel injection in the engine automatic stop and restart apparatus according to the first embodiment of the present invention when an engine is restarted.

Here, the fuel injection when the engine 20 is restarted is described. FIG. 5 is a diagram illustrating the fuel injection when the engine is restarted in the engine automatic stop and restart apparatus according to the first embodiment of the present invention.

FIG. 5 illustrates a case where the engine 20 has four cylinders, and the arrow in the diagram indicates an ignition timing. The ignition is stopped during the automatic stop, and is restarted at a predetermined timing after starting the restart operation (here, every 5 degrees of the crank angle BTDC of a cylinder in the compression stroke). In addition, the cross-hatching part in the diagram indicates a fuel injection timing. The fuel injection is stopped during automatic stop, and is restarted after starting the restart operation substantially simultaneously in a predetermined plurality of cylinders (for example, #1 cylinder in the intake stroke and #3 cylinder in the exhaust stroke) (time t1). After that, the fuel injection is restarted at a predetermined timing (every 5 degrees of the crank angle BTDC of a cylinder in the combustion stroke).

The engine control unit 100 determines a first firing timing of the engine by the fuel injection after the restart, and sets a first firing judgment flag F2 to "1" when the first firing timing of the engine comes. For instance, the fuel injected into the #1 cylinder in the intake stroke at time t2 of FIG. 5 is ignited to cause the first firing at time t5. Note that, the engine control unit 100 resets the first firing judgment flag F2 to "0" again when the automatic stop condition is satisfied.

Next, in Step 202, the engine control unit 100 judges based on a self-resumption judgment flag F3 whether or not the engine 20 is self-resumed. When the engine 20 is not self-resumed, namely, when the self-resumption judgment flag F3 is "0" (NO), the process proceeds to the next Step 203. On the other hand, when the engine 20 is self-resumed, namely, when the self-resumption judgment flag F3 is "1" (YES), it is judged that the engine 20 is self-resumed by combustion, and the process proceeds to Step 206.

Next, in Step 203, the engine control unit 100 delivers the drive signal S1 to the start control unit 30 so as to turn on the power supply to the starter motor 41. In addition, measurement of power supply period to the starter motor 41 is started.

Next, in Step 204, the engine control unit 100 judges whether or not an absolute value Ndiff1 of an rpm difference between the rpm of the engine Nr and the estimated rpm of the pinion gear Nst is smaller than an rpm difference threshold value Ndiffth1. When the absolute value Ndiff1 is smaller than the rpm difference threshold value Ndiffth1 (YES), the process proceeds to the next Step S205. When the absolute value Ndiff1 is equal to or larger than the rpm difference threshold value Ndiffth1 (NO), the process proceeds to Step 208.

Figure 6:
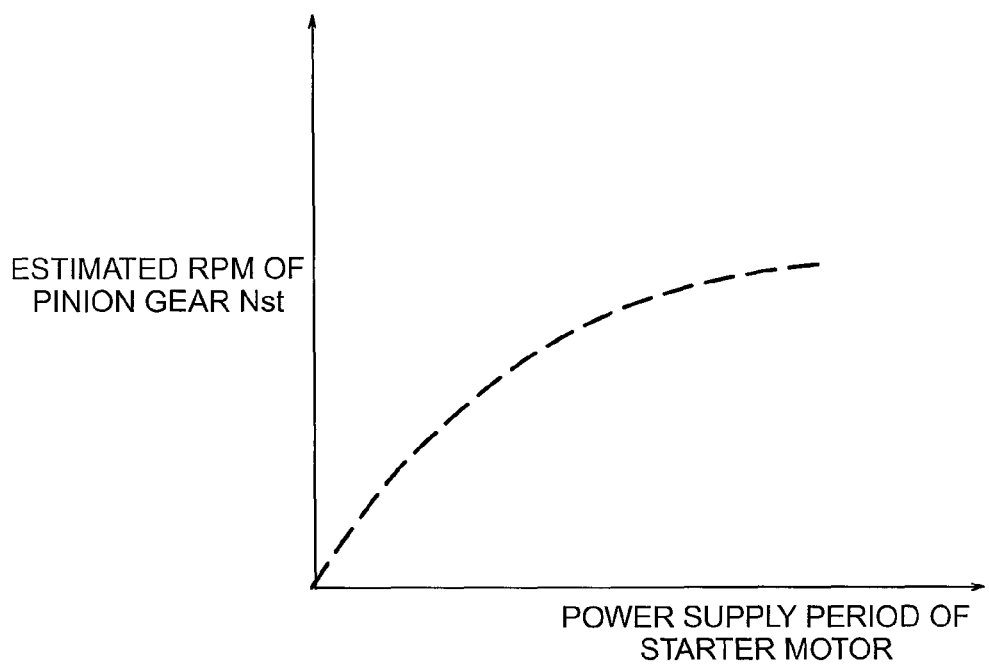
FIG. 6 is a graph illustrating a rpm table describing a relationship between a power supply period of a starter motor and an estimated rpm of a pinion gear.

Here, the engine control unit 100 calculates the rpm of the engine Nr based on a period of the crank angle signal output from the crank angle sensor 23. In addition, the engine control unit 100 determines the estimated rpm of the pinion gear Nst corresponding to the power supply period of the starter motor 41 from the rpm table as illustrated in FIG. 6, for example, based on the measured power supply period. The rpm difference threshold value Ndiffth1 is a value at which the pinion gear 42 and the ring gear 22 can be engaged with each other, which is 100 rpm, for example.

Note that, the rpm of the engine Nr may be determined by FV (frequency to voltage) conversion of a detection signal from a rotary encoder or a pulse generator that can detect pulses based on teeth of the ring gear 22, instead of the calculation based on the crank angle signal of the crank angle sensor 23. In addition, the pinion gear 42 usually has fewer teeth than the ring gear 22 has. In order to avoid confusion, the rpm of the engine Nr and the estimated rpm of the pinion gear Nst are converted into values of rpm of the ring gear 22 to be used, considering a ratio of teeth between the pinion gear 42 and the ring gear 22.

Next, in Step 205, the engine control unit 100 delivers the drive signal S2 to the start control unit 30, to thereby turn on power supply to the solenoid 43.

In Step 206, the engine control unit 100 resets the automatic stop flag F1 to "0".

Next, in Step 207, the engine control unit 100 does not deliver the drive signal S1 to the start control unit 30, to thereby turn off the power supply to the starter motor 41. In addition, measurement of the power supply period to the starter motor 41 is finished and reset.

Next, in Step 208, the engine control unit 100 does not deliver the drive signal S2 to the start control unit 30, to thereby turn off the power supply to the solenoid 43. In this case, attraction force is not generated between the solenoid 43 and the plunger 44, and hence the plunger 44 does not move in the axial direction of the rotation shaft of the starter motor 41. Therefore, the pinion gear 42 is not pushed in the axial direction, and hence the pinion gear 42 and the ring gear 22 are not engaged with each other.

First, in Step 301, the engine control unit 100 judges whether or not the first firing timing of the engine has passed, based on the first firing judgment flag F2. When the first firing timing of the engine has passed, namely, when the first firing judgment flag F2 is "1" (YES), the process proceeds to the next Step 302. On the other hand, when the first firing timing of the engine has not passed, namely, when the first firing judgment flag F2 is "0" (NO), the process proceeds to Step 306.

Next, in Step 302, the engine control unit 100 judges whether or not the rpm of the engine Nr is higher than the estimated rpm of the pinion gear Nst. When the rpm of the engine Nr is higher than the estimated rpm of the pinion gear Nst (YES), it is judged that the engine 20 is rotating by itself, and the process proceeds to Step 303. On the contrary, when the rpm of the engine Nr is equal to or lower than the estimated rpm of the pinion gear Nst (NO), it is judged that the engine 20 is not rotating by itself, and the process proceeds to Step 306.

Next, in Step 303, the engine control unit 100 counts up a self rotation time counter T1.

Next, in Step 304, the engine control unit 100 judges whether or not a value of the self rotation time counter T1 is equal to or larger than the self-resumption judgment threshold value. When the value of the self rotation time counter T1 is equal to or larger than the self-resumption judgment threshold value (YES), it is judged that the engine 20 is self-resumed, and the process proceeds to Step 305. On the contrary, when the value of the self rotation time counter T1 is smaller than the self-resumption judgment threshold value (NO), the process is finished. Here, the self-resumption judgment threshold value is a period during which the engine 20 is apparently combusted by itself, which is 100 ms, for example.

Next, in Step 305, the engine control unit 100 sets the self-resumption judgment flag F3 to "1", and the process is finished. Note that, the engine control unit 100 resets the self-resumption judgment flag F3 to "0" when the rpm of the engine Nr exceeds a predetermined value, for example, 700 rpm after the automatic stop condition is satisfied.

In Step 306, the engine control unit 100 resets the self rotation time counter T1 to "0", and then the process is finished.

Next, the operation of the engine automatic stop and restart apparatus is described along the time in the timing chart.

Figure 7:
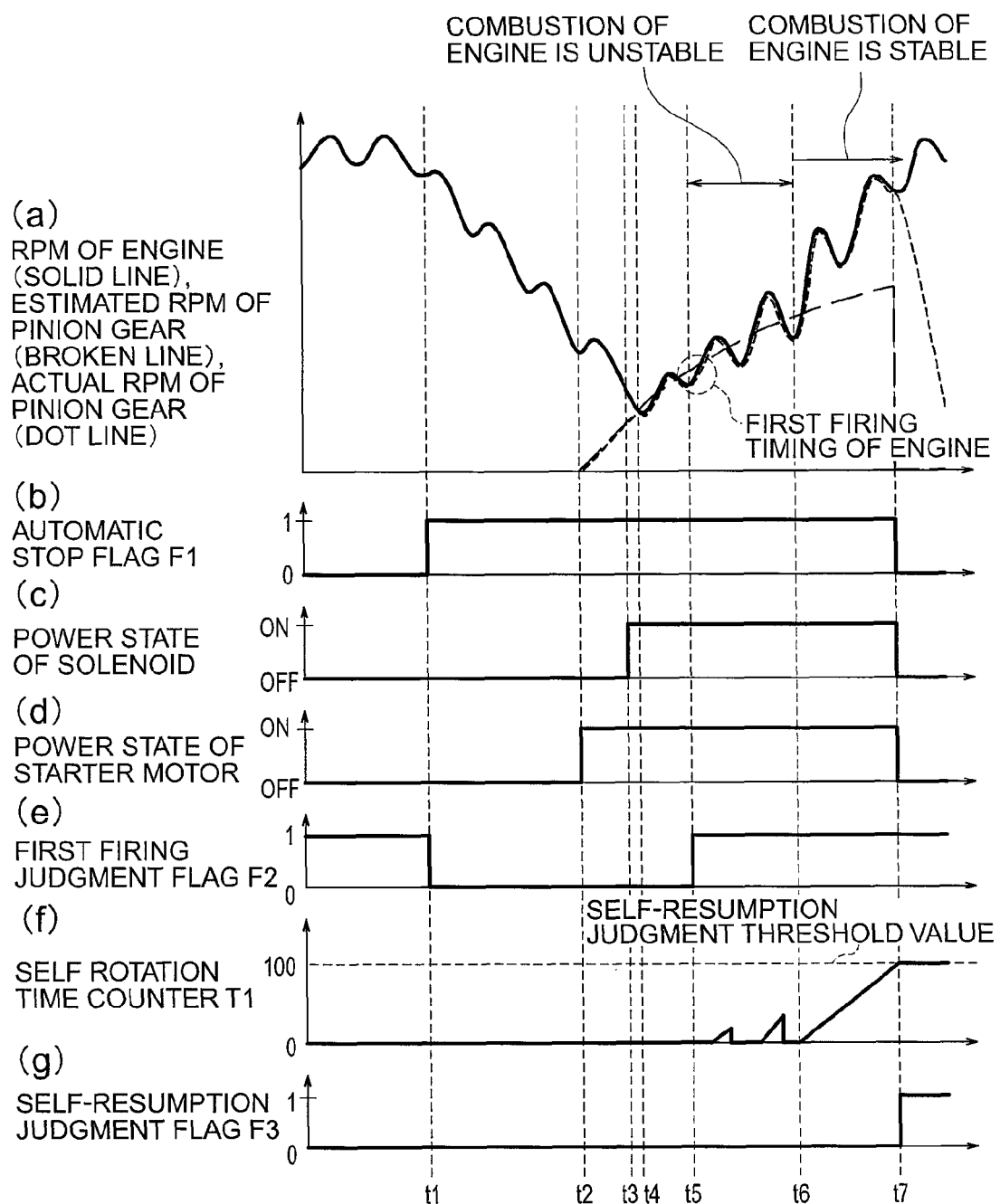
FIG. 7 is a timing chart illustrating operation of the engine automatic stop and restart apparatus according to the first embodiment of the present invention when combustion of the engine is unstable after the restart.

The timing chart illustrated in FIG. 7 illustrates operation in a case where the combustion of the engine 20 is unstable when the engine automatic stop is performed from the vehicle running state, the pinion gear 42 and the ring gear 22 are engaged with each other while the engine is rotating, and the engine restart is performed by cranking of the starter motor 41.

In FIG. 7, part (a) indicates temporal changes of an rpm of the engine (solid line), an rpm of the starter motor, namely the estimated rpm of the pinion gear Nst (broken line), and an actual rpm of the pinion gear (dot line). Note that, the actual rpm of the pinion gear is obtained by experiment using the rpm sensor for comparison. Part (b) indicates states of the automatic stop flag F1, which is set to "1" when the engine 20 is stopped automatically and is reset to "0" when the engine 20 is self-resumed.

Part (c) indicates a temporal change of power state of the solenoid 43. Part (d) indicates a temporal change of power state of the starter motor 41. Part (e) indicates a state of the first firing judgment flag F2, which is set to "1" at the first firing timing of the engine in accordance with the fuel injection after the restart process starts, and is reset to "0" when the engine is automatically stopped.

Part (f) indicates a temporal change of the self rotation time counter T1, which is counted up when the engine 20 is rotating by itself and is reset to "0" when the engine is not rotating by itself. Part (g) indicates a state of the self-resumption judgment flag F3, which is set to "1" when the engine is self-resumed, and is reset to "0" when the rpm of the engine Nr exceeds a predetermined value, for example, 700 rpm after the automatic stop condition is satisfied.

First, at time t1 when the automatic stop condition is satisfied while the vehicle is running, the automatic stop flag F1 is set to "1" (Step 103 of FIG. 2). Next, at time t2 when the restart condition is satisfied, the fuel injection is restarted, and at the same time, because the engine 20 is not self-resumed yet, the starter motor 41 is supplied with power and starts to rotate (Steps 201 to 203 of FIG. 3).

Next, at time t3 when the absolute value Ndiff1 of the rpm difference between the rpm of the engine Nr and the estimated rpm of the pinion gear Nst becomes smaller than the rpm difference threshold value Ndiffth1 at which the pinion gear 42 and the ring gear 22 can be engaged with each other, the solenoid 43 is supplied with power so as to push the pinion gear 42 so that the pinion gear 42 and the ring gear 22 are engaged with each other (Step 205 of FIG. 3).

Next, at time t4, the rpm of the engine Nr is synchronized with the starter motor rpm, namely the estimated rpm of the pinion gear Nst, with the result that the pinion gear 42 and the ring gear 22 are completely engaged with each other. As can be seen, there is generated a time lag between time t3 and time t4, from start of moving the pinion gear 42 in the axial direction for starting engagement between the pinion gear 42 and the ring gear 22 at time t3 to completion of moving the pinion gear 42 when the pinion gear 42 is engaged completely with the ring gear 22.

Next, at time t5, the fuel injected in the #1 cylinder (engine 20) in the intake stroke at time t2 is combusted so that the first firing of the engine 20 occurs, and the rpm of the engine Nr increases. At that time, the first firing judgment flag F2 is set to "1", and after that the self-resumption process is performed (Step 301 of FIG. 4).

Next, during the period from time t5 to time t6, when the combustion of the engine 20 is unstable, the rpm of the engine Nr increases while crossing the estimated rpm of the pinion gear Nst as illustrated in FIG. 7. Therefore, the self rotation time counter T1 is counted up (Step 303 of FIG. 4). However, when the rpm of the engine Nr becomes smaller than the estimated rpm of the pinion gear Nst, the self rotation time counter T1 is reset to "0" (Step 306 of FIG. 4), and hence the self-resumption judgment of the engine 20 is not satisfied (Step 304 of FIG. 4).

Next, after time t6, combustion of the engine 20 becomes stable, and the rpm of the engine Nr increases by itself so as to be larger than the estimated rpm of the pinion gear Nst, and the self rotation time counter T1 is counted up (Step 303 of FIG. 4).

Next, at time t7, a value of the self rotation time counter T1 becomes equal to or larger than the self-resumption judgment threshold value, and it is judged that the engine 20 has become a state of being capable of self rotation with only the fuel supply. Then, the self-resumption judgment flag F3 is set to "1" (Steps 304 and 305 of FIG. 4).

As a result, it is judged that the engine 20 is self-resumed (YES) in Steps 202 and 206 to 208 of the restart control routine illustrated in FIG. 3, and the automatic stop flag F1 is reset to "0". Then, power supply to the starter motor 41 is turned off to stop rotation of the starter motor 41. Then, power supply to the solenoid 43 is turned off to disengage the pinion gear 42 and the ring gear 22.

Figure 8:
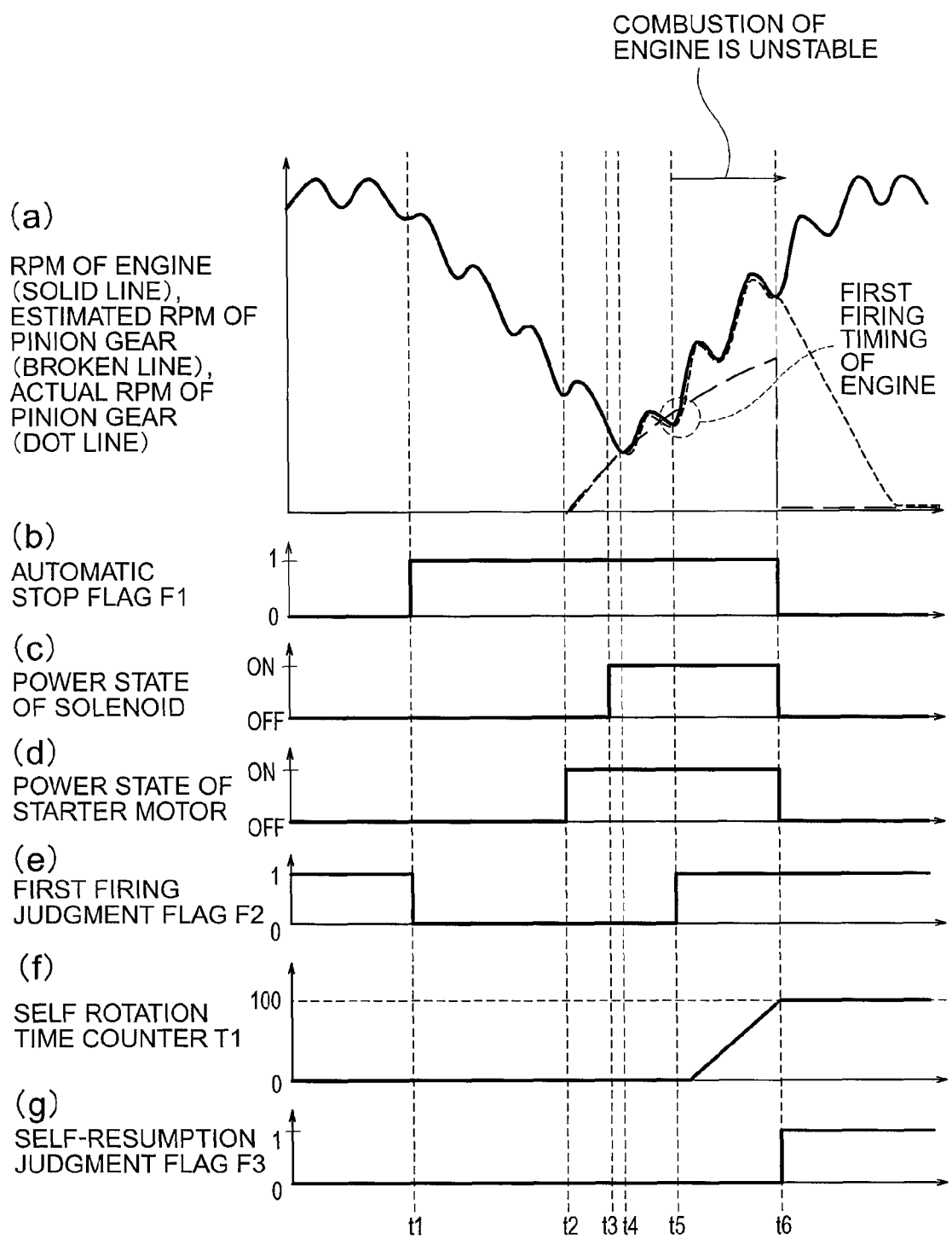
FIG. 8 is a timing chart illustrating operation of the engine automatic stop and restart apparatus according to the first embodiment of the present invention when combustion of the engine is stable after the restart.

The timing chart illustrated in FIG. 8 indicates operation in the case where the combustion of the engine 20 is stable when the engine automatic stop is performed from the vehicle running state, the pinion gear 42 and the ring gear 22 are engaged with each other while the engine is rotating, and the engine restart process is performed by the cranking of the starter motor 41.

In FIG. 8, parts (a)-(g) are the same as parts (a)-(g) of FIG. 7.

First, the operation from time t1 to time t5 is the same as the operation from time t1 to time t5 of FIG. 7.

After time t5, in the case where the combustion of the engine 20 is stable, the rpm of the engine Nr increases by itself so as to be larger than the estimated rpm of the pinion gear Nst, and the self rotation time counter T1 is counted up (Step 303 of FIG. 4).

Next, at time t6, a value of the self rotation time counter T1 becomes equal to or larger than the self-resumption judgment threshold value, and it is judged that the engine 20 has become a state of being capable of self rotation with only the fuel supply. Then, the self-resumption judgment flag F3 is set to "1" (Steps 304 and 305 of FIG. 4).

As a result, it is judged that the engine 20 is self-resumed (YES) in Steps 202 and 206 to 208 of the restart control routine illustrated in FIG. 3, and the automatic stop flag F1 is reset to "0". Then, power supply to the starter motor 41 is turned off to stop rotation of the starter motor 41. Then, power supply to the solenoid 43 is turned off to disengage the pinion gear 42 and the ring gear 22.

As described above, the engine automatic stop and restart apparatus according to the first embodiment of the present invention judges the self-resumption of the engine 20 based on the rpm of the engine Nr and the estimated rpm of the pinion gear Nst even if the combustion of the engine 20 is unstable after the engine is restarted. Therefore, the restart of the engine can be performed securely. In addition, when combustion of the engine 20 becomes stable, the self-resumption of the engine 20 is judged based on the rpm of the engine Nr and the estimated rpm of the pinion gear Nst. Therefore, power supply period of the starter motor 41 can be suppressed to a minimum.

Second Embodiment

An engine automatic stop and restart apparatus according to a second embodiment of the present invention is described with reference to FIGS. 9 to 12. A structure of the engine automatic stop and restart apparatus according to the second embodiment of the present invention is the same as the first embodiment described above.

In the second embodiment, wasteful drive of the starter motor 41 is prevented even if the self-resumption of the engine 20 is delayed in the case where the rpm of the engine Nr becomes smaller than the estimated rpm of the pinion gear Nst due to a ripple of the rpm of the engine Nr when combustion of the engine 20 becomes stable after the engine is restarted.

Figure 9:
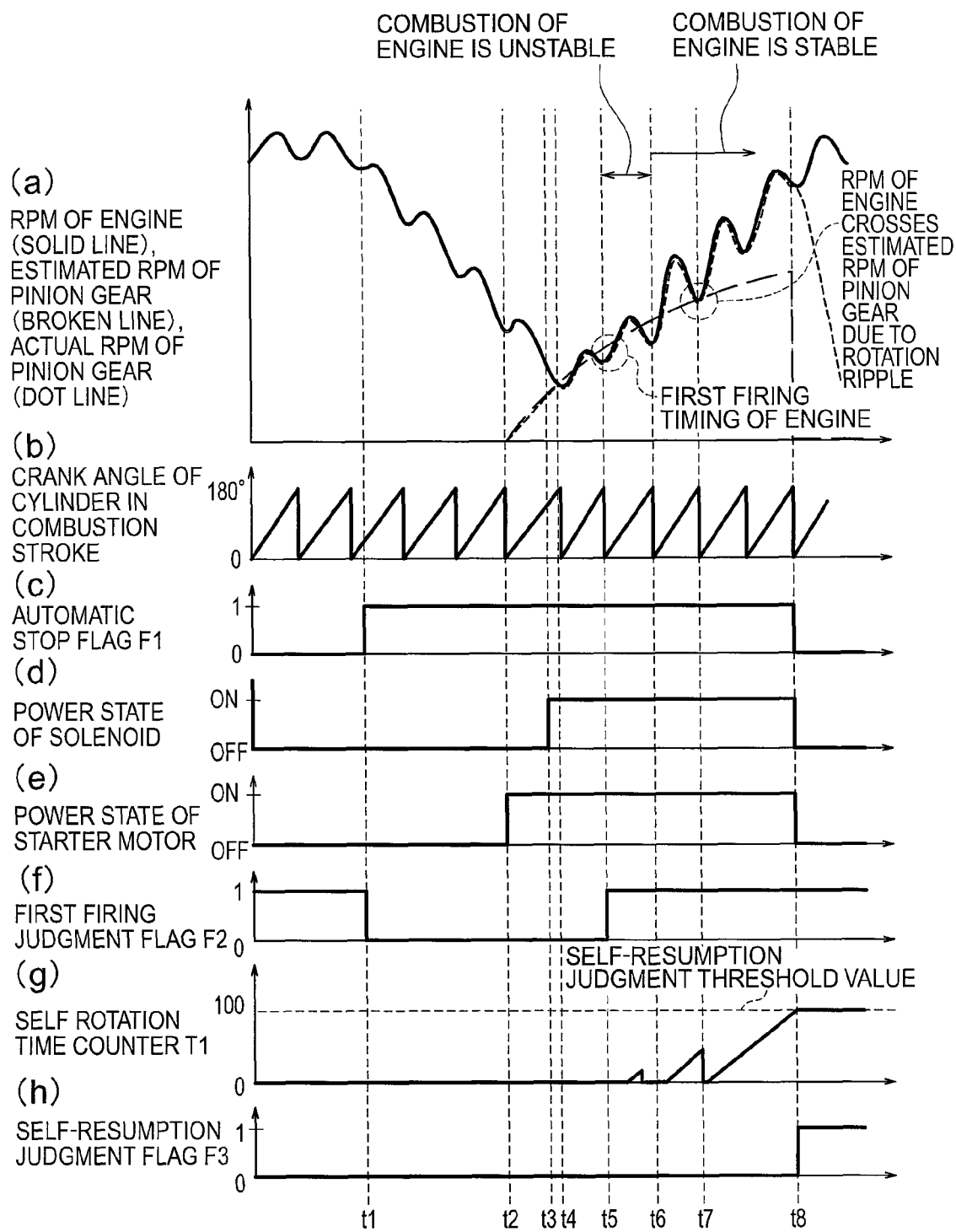
FIG. 9 is a timing chart illustrating operation of the engine automatic stop and restart apparatus according to the first embodiment of the present invention when combustion of the engine is unstable due to rotation ripple after the restart.

As illustrated in FIG. 9, the engine automatic stop and restart apparatus of the first embodiment described above judges that the engine 20 cannot be self-resumed at time t2 when the engine 20 is restarted after the engine is automatically stopped at time t1, and starts supply of electricity to the starter motor 41. Then, the engine automatic stop and restart apparatus supplies electricity to the solenoid 43 at time t3 so as to start connection between the pinion gear 42 and the ring gear 22, and the connection is completed at time t4. Note that, parts (a)-(h) of FIG. 9 except part (b) are the same as parts (a)-(g) of FIG. 7. Part (b) of FIG. 9 indicates a temporal change of the crank angle of the cylinder in the combustion stroke.

After that, at time t5, the rpm of the engine Nr increases due to the combustion of the engine 20 so that the first firing of the engine 20 occurs. During the period from time t5 to time t6, the combustion of the engine 20 is unstable. Therefore, when the rpm of the engine Nr becomes lower than the estimated rpm of the pinion gear Nst, the self rotation time counter T1 is reset to "0". Thus, the engine 20 is not self-resumed.

After time t6, combustion of the engine 20 becomes stable, but as illustrated in parts (a) and (b) of FIG. 9, the rpm of the engine Nr fluctuates up and down in accordance with the crank angle. Therefore, when the rpm of the engine Nr becomes lower than the estimated rpm of the pinion gear Nst even slightly, the self rotation time counter T1 is reset to "0".

There is a problem that the engine 20 is self-resumed only after time t7 when the rpm of the engine Nr becomes apparently higher than the estimated rpm of the pinion gear Nst.

The second embodiment is aimed at controlling the engine 20 to be self-resumed even if the rpm of the engine Nr becomes lower than the estimated rpm of the pinion gear Nst due to the fluctuation of the rpm of the engine Nr, to thereby suppress the power supply period of the starter motor 41 to the minimum.

Next, operation of the engine automatic stop and restart apparatus according to the second embodiment is described with reference to the drawings.

Figure 10:
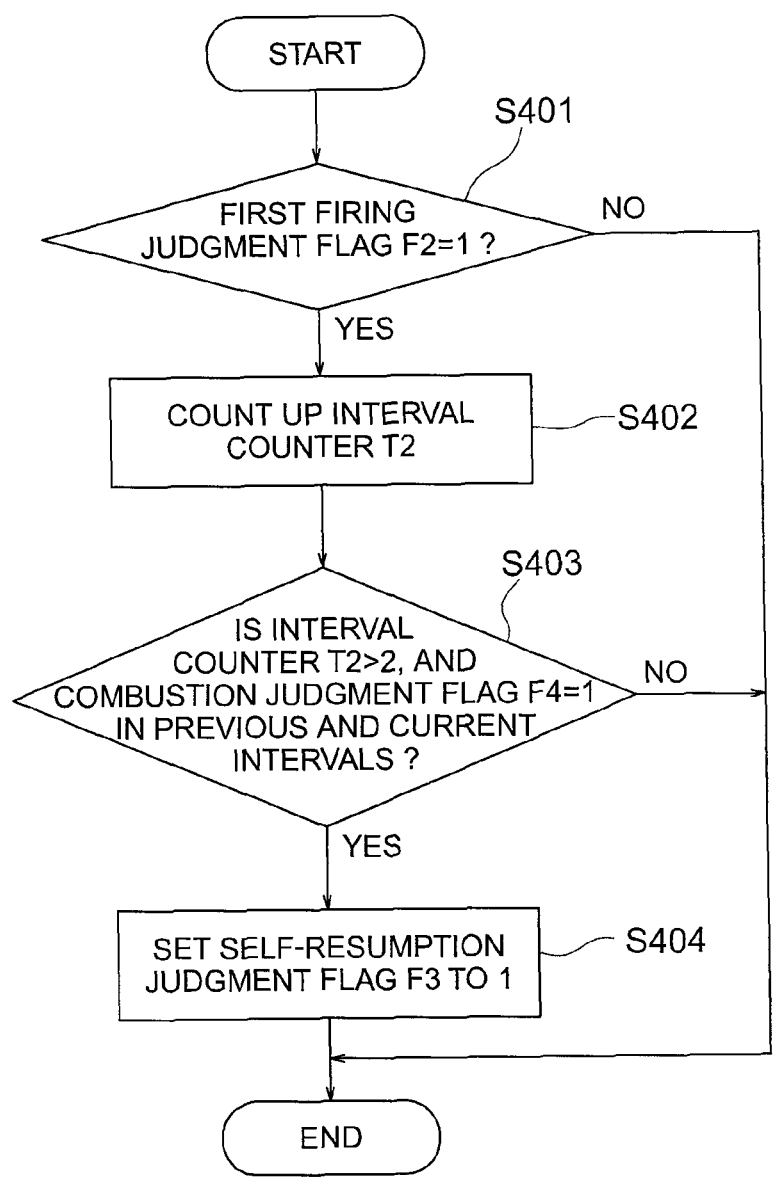
FIG. 10 is a flowchart illustrating operation of an engine automatic stop and restart apparatus according to a second embodiment of the present invention.
Figure 11:
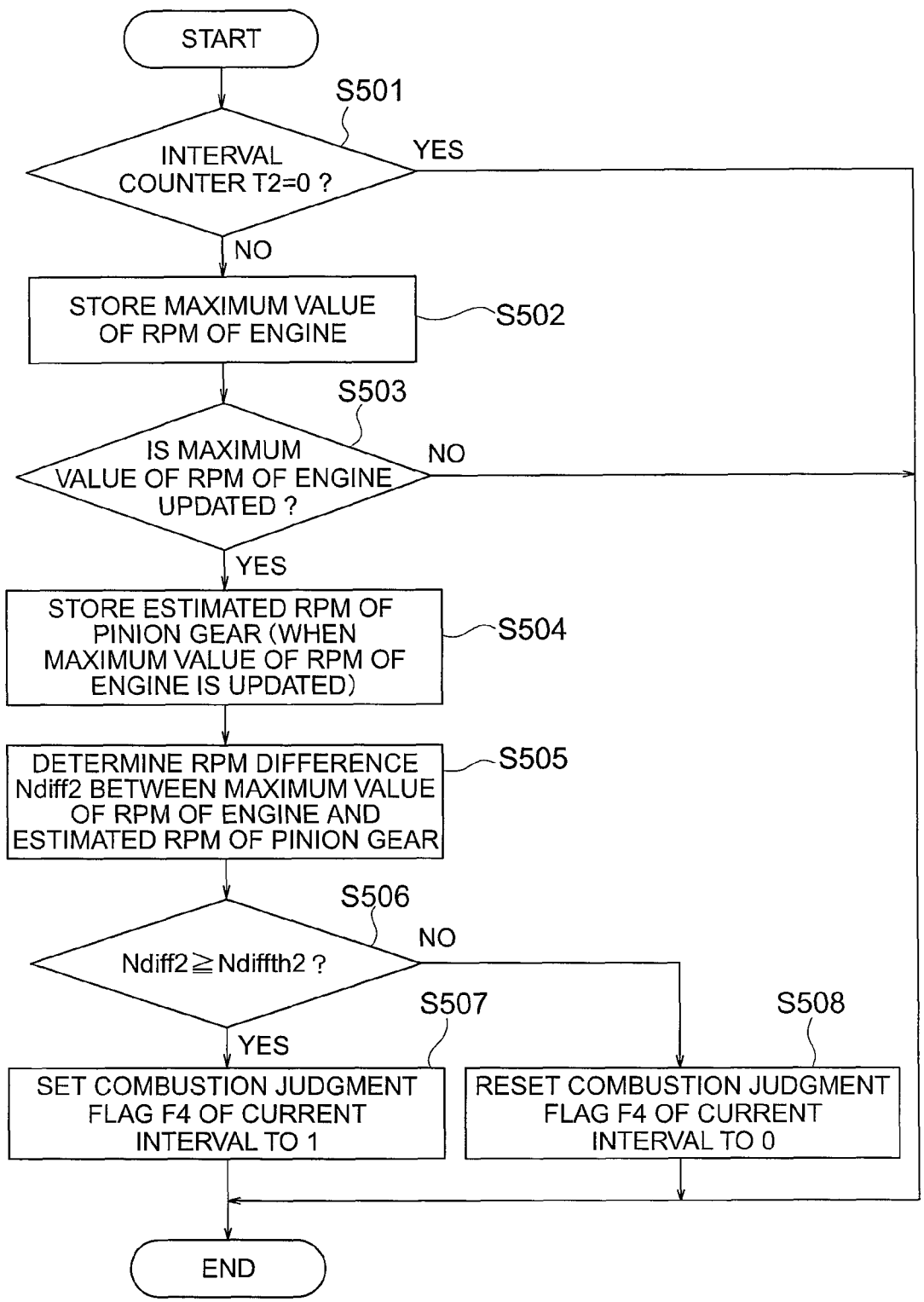
FIG. 11 is a flowchart illustrating operation of the engine automatic stop and restart apparatus according to the second embodiment of the present invention.

FIGS. 10 and 11 are flowcharts illustrating operation of the engine automatic stop and restart apparatus according to the second embodiment of the present invention. The self-resumption process illustrated in FIG. 10 is performed at a constant period of, for example, 100 to 200 milliseconds (for simple description, every 0 degrees of the crank angle). The self-resumption process illustrated in FIG. 11 is performed at a constant period of, for example, 1.25 milliseconds. Note that, processes other than the self-resumption are the same as those in the first embodiment.

First, in Step 401 of FIG. 10, the engine control unit 100 restarts the fuel injection so as to restart the engine 20, and judges whether or not the first firing timing of the engine has passed, based on the first firing judgment flag F2. When the first firing timing of the engine has passed, namely, when the first firing judgment flag F2 is "1" (YES), the process proceeds to the next Step 402. On the contrary, when the first firing timing of the engine has not passed, namely, when the first firing judgment flag F2 is "0" (NO), the process is finished. Note that, the engine control unit 100 resets the first firing judgment flag F2 to "0" when the automatic stop condition is satisfied again.

Next, in Step 402, the engine control unit 100 counts up an interval counter T2 by "1". When the crank angle of the cylinder in the combustion stroke newly enters the interval, the interval counter T2 is counted up (for example, at time t5 of FIG. 5). Note that, the interval counter T2 is reset to "0" when the engine 20 is self-resumed.

Next, in Step 403, the engine control unit 100 judges whether or not the engine 20 is self-resumed. When the engine 20 is self-resumed (YES), the process proceeds to the next Step 404. When the engine 20 is not self-resumed (NO), the process is finished. In other words, when the interval counter T2 is larger than two, and when a combustion judgment flag F4 is "1" in both the previous intervals and the current interval (YES), it is judged that the engine is self-resumed. On the contrary, when the combustion judgment flag F4 of the previous interval or the combustion judgment flag F4 of the current interval is "0" (NO), it is judged the engine is not self-resumed.

Next, in Step 404, the engine control unit 100 sets the self-resumption judgment flag F3 to "1", and the process is finished.

In Step 501 of FIG. 11, the engine control unit 100 judges whether or not the interval counter T2 is 0. When the interval counter T2 is 0 (YES), the process is finished. On the contrary, when the interval counter T2 is not 0 (NO), the process proceeds to the next Step 502.

Next, in Step 502, the engine control unit 100 compares the previous rpm of the engine with the current rpm of the engine, and stores a larger one as a maximum value in the corresponding region of the corresponding interval in the RAM. Here, the engine control unit 100 calculates the rpm of the engine based on a period of the crank angle signal output from the crank angle sensor 23. Note that, an initial value of the maximum value of the rpm of the engine is 0 rpm, and the corresponding region of the RAM is initialized when the engine is automatically stopped.

Next, in Step 503, the engine control unit 100 judges whether or not the maximum value of the rpm of the engine is updated. When the maximum value of the rpm of the engine is updated (YES), the process proceeds to the next Step 504. When the maximum value of the rpm of the engine is not updated (NO), the process is finished.

Next, in Step 504, the engine control unit 100 stores the estimated rpm of the pinion gear when the maximum value of the rpm of the engine is updated in the corresponding region of the corresponding interval in the RAM. Here, the engine control unit 100 determines the estimated rpm of the pinion gear Nst corresponding to the power supply period of the starter motor 41 from the rpm table as illustrated in FIG. 6, for example, based on the measured power supply period. Note that, an initial value of the estimated rpm of the pinion gear when the maximum value of the rpm of the engine is updated is 0 rpm, for example, and the corresponding region of the RAM is initialized when the engine is automatically stopped.

Next, in Step 505, the engine control unit 100 determines the rpm difference Ndiff2 between the maximum value of the rpm of the engine and the estimated rpm of the pinion gear Nst when the maximum value of the rpm of the engine is updated. Note that, this rpm difference Ndiff2 is 0 rpm or larger.

Next, in Step 506, the engine control unit 100 judges whether or not the rpm difference Ndiff2 is equal to or larger than the rpm difference threshold value Ndiffth2, namely, whether or not the engine 20 is rotating by itself. When the rpm difference Ndiff2 is equal to or larger than the rpm difference threshold value Ndiffth2 (YES), the process proceeds to the next Step 507. When the rpm difference Ndiff2 is smaller than rpm difference threshold value Ndiffth2 (NO), the process proceeds to Step 508. Note that, the rpm difference threshold value Ndiffth2 is 50 rpm, for example.

Next, in Step 507, the engine control unit 100 judges that the engine 20 is rotating by itself and sets the combustion judgment flag F4 of the current interval to "1", and then the process is finished.

Then, in Step 508, the engine control unit 100 resets the combustion judgment flag F4 of the current interval to "0", and the process is finished.

Next, along the time of the timing chart, the operation of the engine automatic stop and restart apparatus is described.

Figure 12:
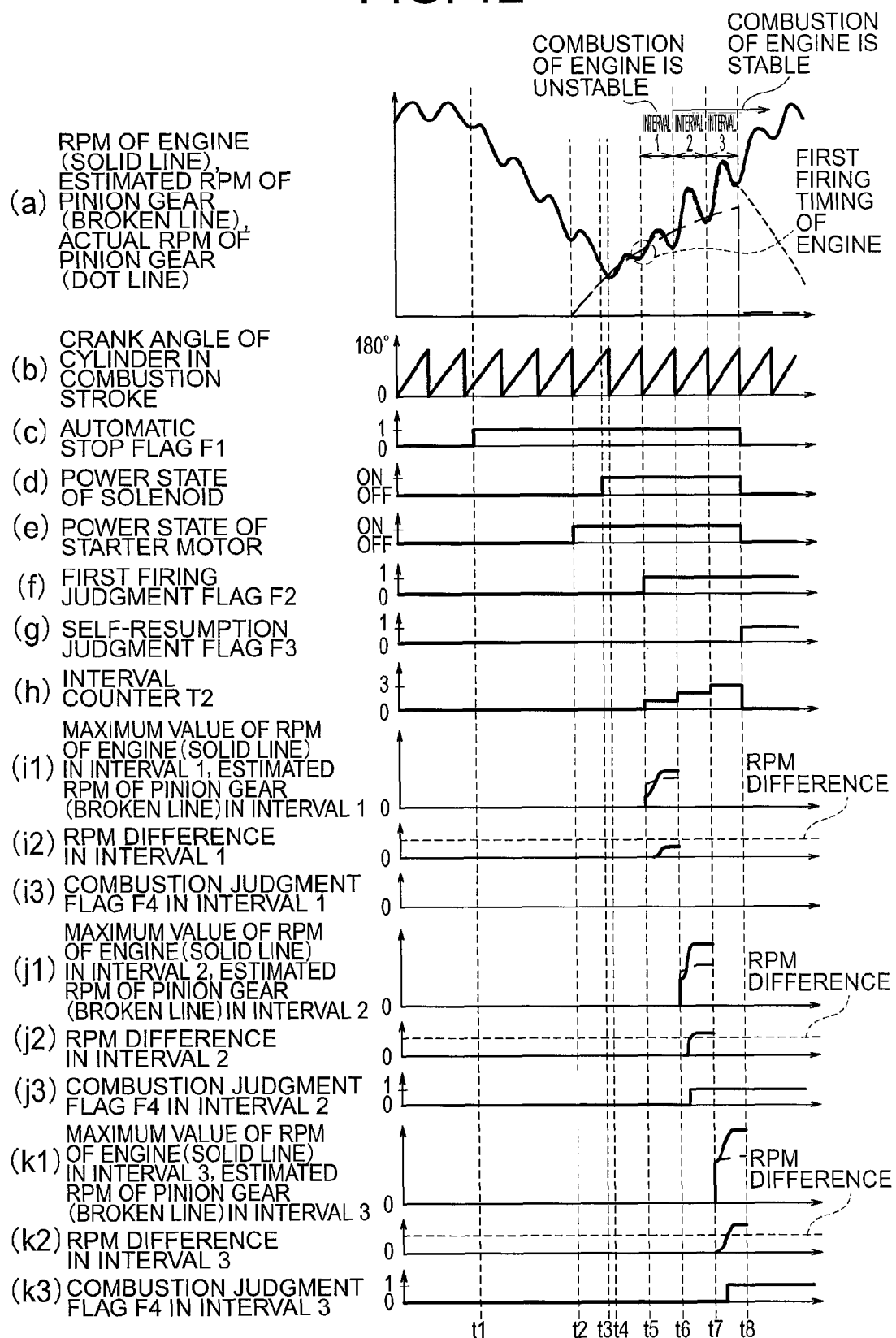
FIG. 12 is a timing chart illustrating operation of the engine automatic stop and restart apparatus according to the second embodiment of the present invention when combustion of an engine is unstable due to rotation ripple after restart.
Figure 13:
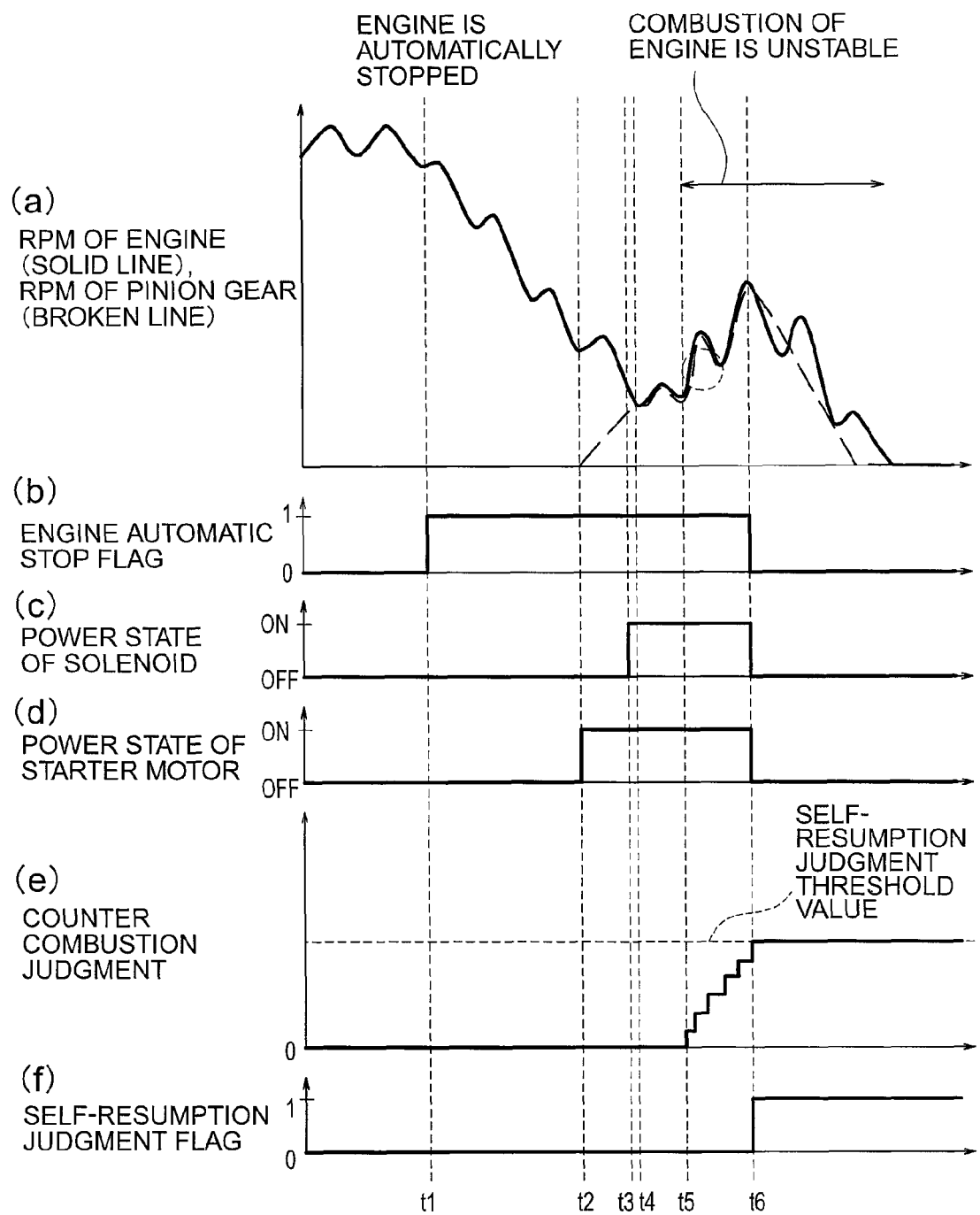
FIG. 13 is a timing chart illustrating operation of a conventional engine automatic stop and restart apparatus when combustion of an engine is unstable after restart.
Figure 14:
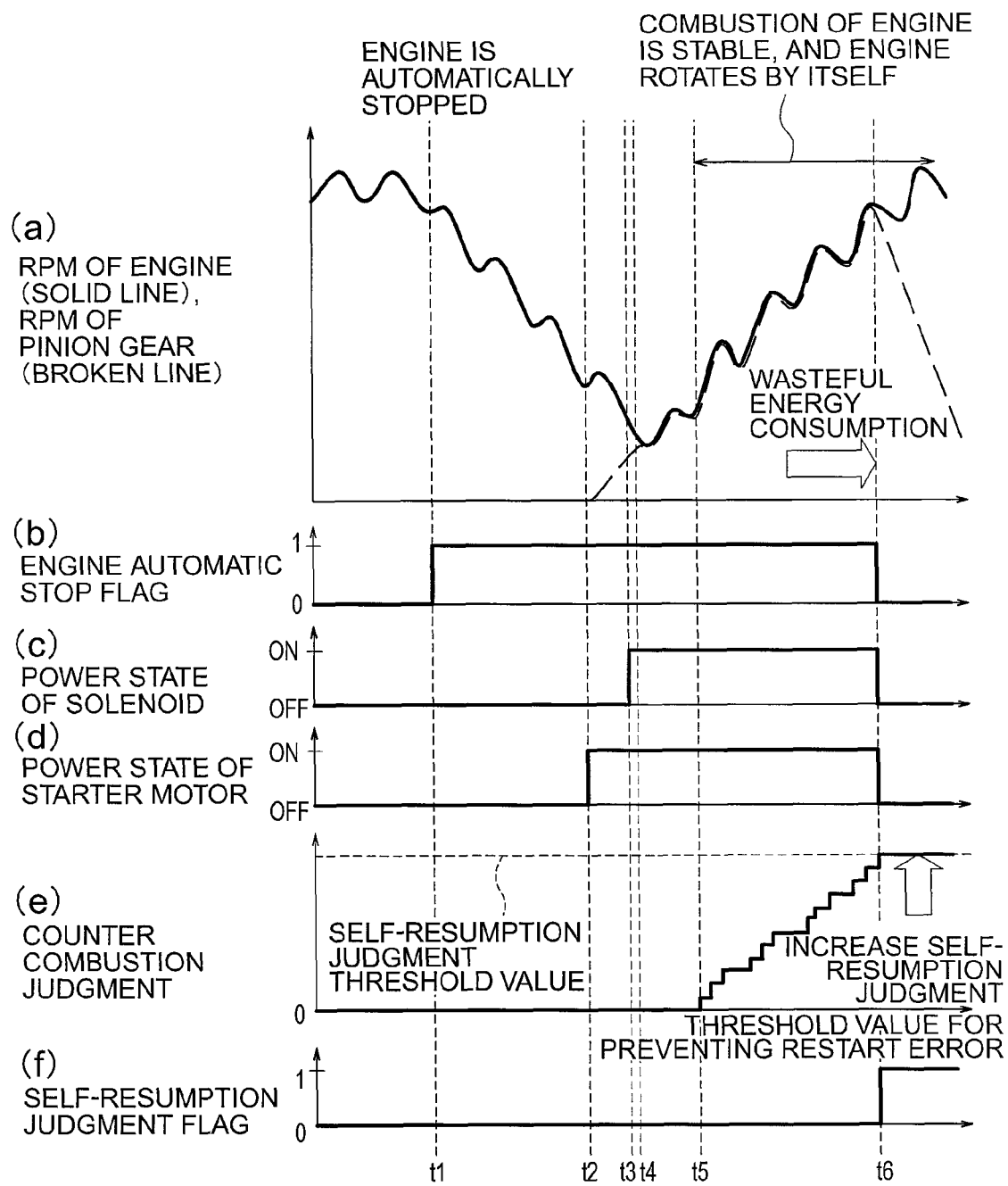
FIG. 14 is a timing chart illustrating operation of the conventional engine automatic stop and restart apparatus when combustion of the engine is stable after the restart.

The timing chart illustrated in FIG. 12 illustrates operation in the case where combustion of the engine 20 is unstable when the engine automatic stop is performed from the vehicle running state, the pinion gear 42 and the ring gear 22 are engaged with each other while the engine is rotating, and the engine is restarted by cranking the starter motor 41.

In FIG. 12, parts (a) to (g) are the same as parts (a) to (e) and (g) of FIG. 7 except part (b). Part (b) indicates a temporal change of the crank angle of the cylinder in the combustion stroke. Part (h) indicates a temporal change of the interval counter T2, which is counted up for every interval (every 0 degrees of the crank angle) and is reset to "0" when the engine 20 is self-resumed.

Part (i1) indicates temporal changes of the maximum value of the rpm of the engine in interval 1 and the estimated rpm of the pinion gear when the maximum value of the rpm of the engine is updated. Part (i2) indicates a temporal change of the rpm difference Ndiff2 between the maximum value of the rpm of the engine in interval 1 and the estimated rpm of the pinion gear when the maximum value of the rpm of the engine is updated. Part (i3) indicates a state of the combustion judgment flag F4 in interval 1.

Part (j1) indicates temporal changes of the maximum value of the rpm of the engine in interval 2 and the estimated rpm of the pinion gear when the maximum value of the rpm of the engine is updated. Part (j2) indicates a temporal change of the rpm difference Ndiff2 between the maximum value of the rpm of the engine in interval 2 and the estimated rpm of the pinion gear when the maximum value of the rpm of the engine is updated. Part (j3) indicates a state of the combustion judgment flag F4 in interval 2.

Part (k1) indicates temporal changes of the maximum value of the rpm of the engine in interval 3 and the estimated rpm of the pinion gear when the maximum value of the rpm of the engine is updated. Part (k2) indicates a temporal change of the rpm difference Ndiff2 between the maximum value of the rpm of the engine in interval 3 and the estimated rpm of the pinion gear when the maximum value of the rpm of the engine is updated. Part (k3) indicates a state of the combustion judgment flag F4 in interval 3.

The automatic stop flag F1 is set to "1" at time t1 when the automatic stop condition is satisfied while the vehicle is running. Next, at time t2 when the restart condition is satisfied, the fuel injection is restarted, and at the same time, the starter motor 41 is supplied with electricity so as to start rotation.

Next, at time t3 when the absolute value Ndiff1 of the rpm difference between the rpm of the engine Nr and the estimated rpm of the pinion gear Nst becomes smaller than the rpm difference threshold value Ndiffth1 at which the pinion gear 42 and the ring gear 22 can be engaged with each other, the solenoid 43 is supplied with electricity so as to push the pinion gear 42 so that the pinion gear 42 and the ring gear 22 are engaged with each other.

Next, at time t4, the rpm of the engine Nr is synchronized with the rpm of the starter motor 41, namely, the estimated rpm of the pinion gear Nst, with the result that the pinion gear 42 and the ring gear 22 are engaged with each other completely.

Next, at time t5, the fuel injected in the intake stroke at time t2 is combusted so that the first firing of the engine 20 occurs, and the rpm of the engine Nr increases. At that time, the first firing judgment flag F2 is set to "1".

Here, during the period from time t5 (0 degrees of the crank angle) to time t6 (0 degrees of the crank angle), if the combustion of the engine 20 is unstable, when the period from time t5 to time t6 is interval 1 (interval counter T2=1), the rpm difference between the maximum value of the rpm of the engine and the estimated rpm of the pinion gear in interval 1 is smaller than the rpm difference threshold value. Therefore, the combustion judgment flag F4 is not set to "1" in interval 1.

Next, after time t6, the combustion of the engine 20 is stable. When the period from time t6 to time t7 during which the rpm of the engine increases by itself is interval 2 (interval counter T2=2), the rpm difference between the maximum value of the rpm of the engine and the estimated rpm of the pinion gear in interval 2 is larger than the rpm difference threshold value. Therefore, the combustion judgment flag F4 is set to "1" in interval 2. Here, at time t7 when interval 2 is finished, the interval counter T2 is 2 or lower, or the combustion judgment flag F4 in interval 1 is "0". Therefore, the self-resumption judgment flag F3 is not set to "1".

Next, during the period from time t7 (0 degrees of the crank angle) to time t8 (0 degrees of the crank angle), when the period from time t7 to time t8 is interval 3 (interval counter T2=3), the rpm difference between the maximum value of the rpm of the engine and the estimated rpm of the pinion gear in interval 3 becomes larger than the rpm threshold value. Therefore, the combustion judgment flag F4 is set to "1" also in interval 3. Here, at time t8 when interval 3 is finished, the interval counter T2 is larger than 2, and the combustion judgment flag F4 is "1" in both interval 2 and interval 3. Therefore, the self-resumption judgment flag F3 is set to "1".

As a result, it is judged that the engine 20 is self-resumed (YES) in Step 202 of the restart control routine illustrated in FIG. 3, and the automatic stop flag F1 is reset to "0". Then, power supply to the starter motor 41 is turned off to stop rotation of the starter motor 41. Then, power supply to the solenoid 43 is turned off to disengage the pinion gear 42 and the ring gear 22.

As described above, even if combustion of the engine 20 is unstable after the engine is restarted, the engine automatic stop and restart apparatus according to the second embodiment of the present invention judges that the engine 20 is self-resumed by continuously detecting for a plurality of intervals a state in which the rpm difference between the maximum value of the rpm of the engine and the estimated rpm of the pinion gear is equal to or larger than the rpm difference threshold value in a predetermined interval of the engine 20. Therefore, the power supply period of the starter motor 41 can be suppressed to a minimum.

What is claimed is:

1. An engine automatic stop and restart apparatus which automatically stops an engine when an automatic stop condition is satisfied, and then restarts the engine when a restart condition is satisfied, the engine automatic stop and restart apparatus comprising:

a starter motor which rotates when supplied with electricity;

a pinion gear provided to a rotation shaft of the starter motor;

a plunger which pushes the pinion gear in a direction of the rotation shaft so that the pinion gear engages with a ring gear provided to a crank shaft of the engine;

a solenoid which moves the plunger in the direction of the rotation shaft when supplied with electricity;

a start control unit which connects a power supply to the starter motor in response to a first drive signal so that the starter motor is supplied with electricity, and which connects the power supply to the solenoid in response to a second drive signal so that the solenoid is supplied with electricity;

a crank angle sensor which detects a crank angle of the engine, to output a crank angle signal;

a fuel injection unit which injects fuel into the engine;

an rpm table which describes a relationship between a power supply period of the starter motor and an estimated rpm of the pinion gear; and an engine control unit which is configured to:
control the fuel injection unit to inject the fuel into the engine after a restart process is started, and output a first drive signal to the start control unit to start supplying electricity to the starter motor and to start measuring of the power supply period of the starter motor;

output a second drive signal to the start control unit to start supplying electricity to the solenoid when an absolute value of a rpm difference between an rpm of the engine calculated based on a period of the crank angle signal, and an estimated rpm of the pinion gear, determined from the rpm table based on the measured power supply period, becomes smaller than a rpm difference threshold value at which the pinion gear and the ring gear can be engaged with each other;

judge that the engine is self-resumed when the engine becomes capable of self rotation with only supplied fuel when the engine rpm calculated based on the period of the crank angle signal is larger than the estimated rpm of the pinion gear determined from the rpm table based on the measured power supply period; and stop outputting the first drive signal to the start control unit to finish supplying electricity to the starter motor when it is judged that the engine is self-resumed, finish measuring the power supply period of the starter motor, and stop outputting the second drive signal to the start control unit to finish supplying electricity to the solenoid.

2. An engine automatic stop and restart apparatus according to claim 1, wherein the engine control unit controls to inject the fuel to the engine after the restart process is started, and judges that the engine is self-resumed in a case where:
   in a first predetermined interval after a first firing of the engine, the rpm of the engine calculated based on the period of the crank angle signal is higher than the estimated rpm of the pinion gear determined from the rpm table based on the measured power supply period; and
   in a second predetermined interval following the first predetermined interval, the rpm of the engine calculated based on the period of the crank angle signal is higher than the estimated rpm of the pinion gear determined from the rpm table based on the measured power supply period.

* * * * *